United States Patent [19]

Yamauchi

[11] Patent Number: 4,800,550
[45] Date of Patent: Jan. 24, 1989

[54] MULTI-FORMAT OPTICAL DISK RECORDING/REPRODUCING SYSTEM

[75] Inventor: Keiichi Yamauchi, Saitama, Japan

[73] Assignee: Pioneer Electronic Corporation, Tokyo, Japan

[21] Appl. No.: 69,126

[22] Filed: Jul. 2, 1987

[30] Foreign Application Priority Data

Jul. 3, 1986 [JP] Japan .................................. 61-157536

[51] Int. Cl.⁴ .......................... G11B 20/10; G11B 5/09
[52] U.S. Cl. ......................................... 369/59; 369/47; 360/48
[58] Field of Search ........................ 369/59, 47, 48, 49; 360/48

[56] References Cited

U.S. PATENT DOCUMENTS 4,688,205  8/1987  Abiko ..................................... 369/59

Primary Examiner—Alan Faber
Assistant Examiner—Kevin John Fournier
Attorney, Agent, or Firm—Sughrue, Mion, Zinn, Macpeak & Seas

[57] ABSTRACT

A multi-format optical disk recording/reproducing system in which data can be recorded in either of two formats having different data capacity. Both error correction and detection codes and synchronizing signals are recorded. However, the synchronizing signals are recorded with different intervals in the two formats.

6 Claims, 5 Drawing Sheets

MULTI-FORMAT OPTICAL DISK RECORDING/REPRODUCING SYSTEM

BACKGROUND OF THE INVENTION

1. Field of the Invention

The present invention relates to an optical disk recording/reproducing system for recording/reproducing digital data on an optical disk.

2. Description of the Prior Art

Hitherto, when digital information was recorded on an optical disk, a predetermined format was formed on the disk in advance so as to be suitable for the quantity and type of the data to be recorded. Accordingly, it was necessary to select and use an optical disk having a format suitable for the information.

The conventional optical disk device was arranged so as to be applicable to an optical disk having a predetermined format, and therefore could not record/reproduce information on any other optical disk having a different format. Accordingly, in the case of using an optical disk having two or more kinds of formats, it was necessary to have available two or more kinds of optical disk devices.

SUMMARY OF THE INVENTION

It is therefore an object of the present invention to eliminate the drawbacks in the prior art.

It is another object of the present invention to provide an optical disk recording/reproducing system in which different formats are formed by varying the periods of synchronizing signals to be added to data.

To achieve the above objects, according to the present invention, in the optical disk recording/reproducing system, a group of data is composed of at least digital data and error detection and error correction codes added to the digital data. The digital data, the error detection code and the error correction code are disposed in a predetermined sequence in the data group. Synchronizing signals are added to the data at first and second intervals to form a first and a second format respectively.

Thus, the group of data is constituted by the digital data, the error detection code, and the error correction code which are arranged in a fixed sequence but synchronizing signals are added to the data group at different intervals to thereby form different formats.

BRIEF DESCRIPTION OF THE DRAWINGS

Other objects and advantages of the invention will become apparent during the following discussion of the accompanying drawings, wherein.

DESCRIPTION OF PREFERRED EMBODIMENT

Figure 1:
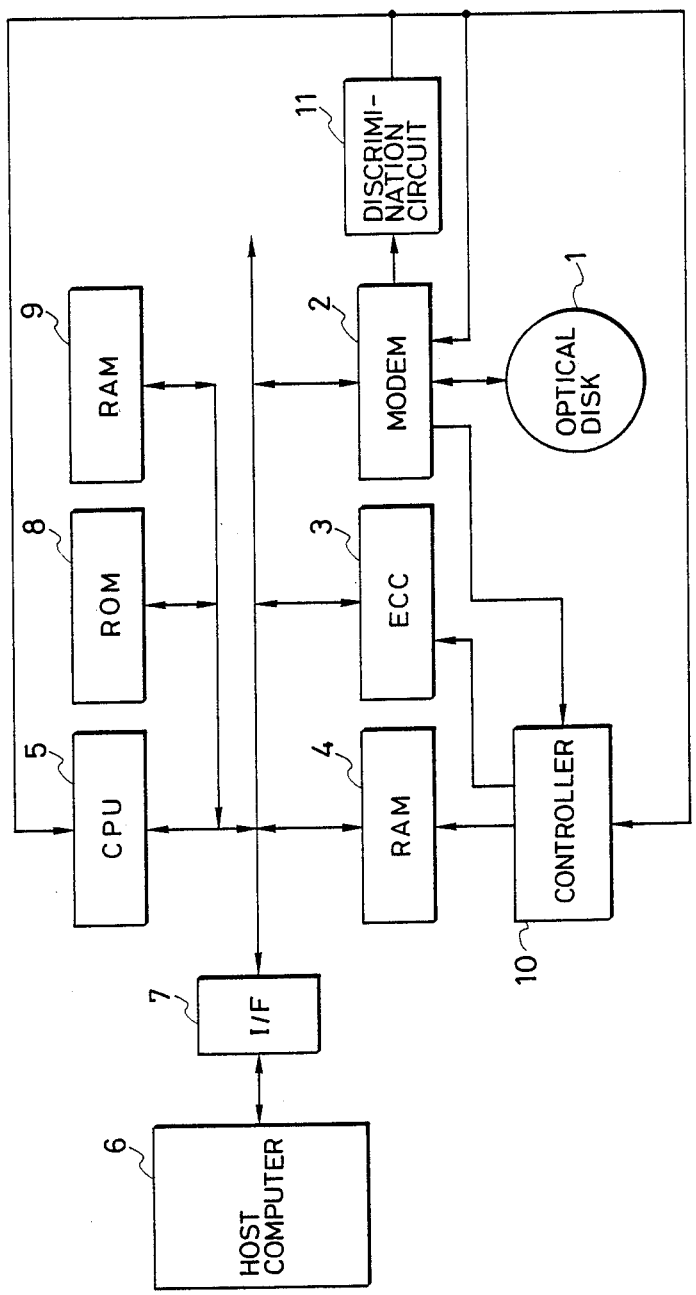
FIG. 1 is a block diagram showing an optical disk device according to the present invention.

Referring to the drawings, an embodiment of the invention will be described hereunder.

FIG. 1 is a block diagram showing an optical disk device according to the present invention. In the drawing, an optical disk 1 is arranged so that a signal modulated by a modulation and demodulation (hereinafter referred to as "modem") circuit 2 is recorded on the optical disk 1 and a signal reproduced from the optical disk 1 is demodulated by the modem circuit 2. An error detection/correction circuit (ECC) 3 is arranged so as to add an error detection code and an error correction code to a recording signal. The ECC 3 also detects and corrects errors in a reproduced signal. A CPU 5 controls various circuits and elements in accordance with a program stored in a ROM 8 and so as to cause RAM 9 to store necessary information. Another RAM 4 is arranged so as to store a signal to be recorded or a reproduced signal. A host computer 6 is arranged so as to transfer or receive, through an interface 7, a signal to be recorded onto or reproduced from the optical disk 1. A controller 10 controls the error detection/correction circuit 3 and the RAM 4. A discrimination circuit 11 detects a discrimination signal out of a demodulated signal from the modem 3.

Figure 4:
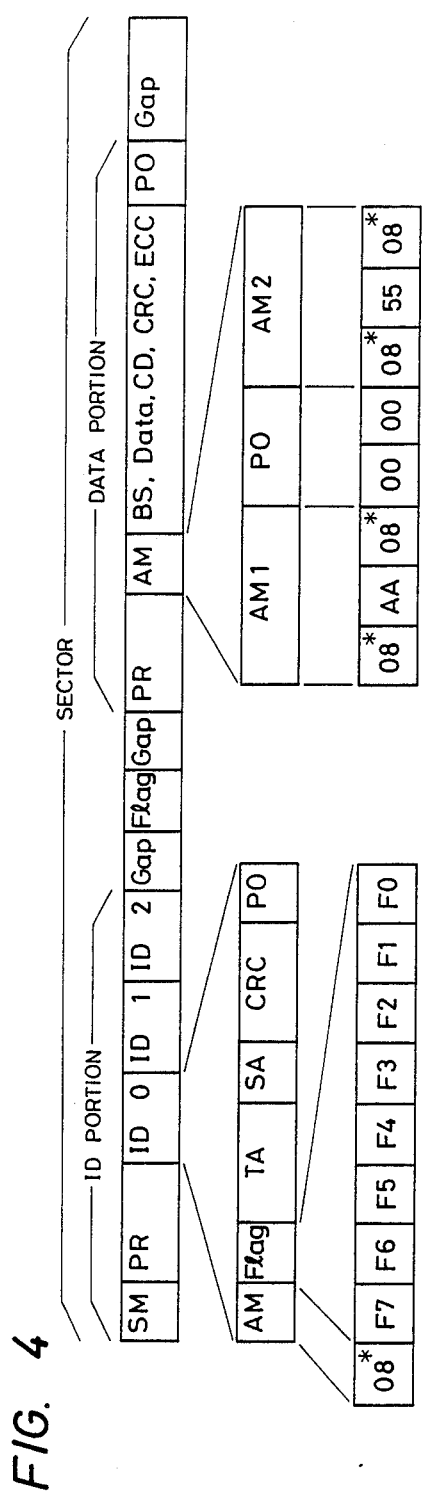
FIGS. 4 and 6 are diagrams each showing an arrangement of data in a sector.
Figure 5:
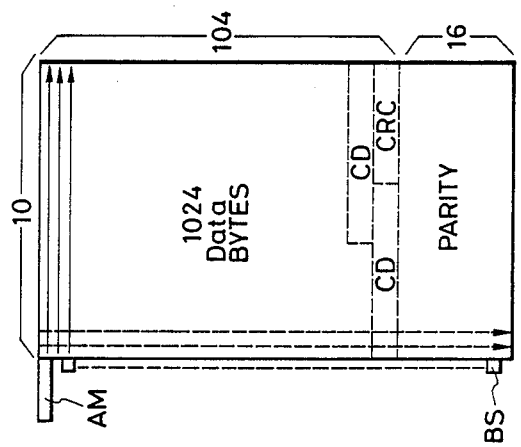
FIGS. 5 and 7 are diagrams each showing an arrangement of a group of data in a table.

The optical disk 1 has two different formats. The first format is arranged, for example, as shown in FIGS. 4 and 5. FIG. 4 shows an arrangement of data in each sector. Each sector is constituted by an ID area and a data area. The ID area formatted in advance is constituted by a sector mark (SM) located at a head portion, a preamble portion (PR) following the sector mark and having clock signal recorded therein, and a triplicated ID portion ($ID_0$, $ID_1$ and $ID_2$) disposed next to the preamble portion. The ID portion is constituted by an address mark (AM) formed of an irregular pattern (08*) which is not generated in a given modulation system (for example $M^2$), a flag portion (Flag) formed of flags $F_7$ through $F_0$, a track address (TA), a sector address (SA), an error detection code (CRC) relating to those data, and a postamble (PO) having a clock signal recorded therein. The same data are recorded in each of the three ID portions, $ID_0$, $ID_1$, $ID_2$. However, the flags $F_1$ and $F_0$ are made to be "00", "01", "10" in the ID portions $ID_0$, $ID_1$ and $ID_2$ respectively, so that the three ID portions can be distinguished from each other. The remainding flags $F_7$ through $F_2$ are utilized to store other necessary information. For example, as a discrimination signal for discriminating formats described later, the flag $F_2$ may be set to "0" in the case of a first format, and to "1" in the case of a second format.

Gap portions (Gap) are formed between the ID area and the data area so that a predetermined flag can be recorded between the gap portions.

In the data area, a preamble portion (PR) having a clock signal recorded therein is formed at the head portion and an address mark portion (AM) is formed next to the preamble portion.

The address mark portion (AM) is constituted by a first address mark ($AM_1$) and a second address mark ($AM_2$), and a postamble (PO) is formed between the address marks. The address mark ($AM_1$) is formed in such a manner that a signal "$AA_H$" (hexadecimal) is disposed between two irregular patterns (08*), and the address mark ($AM_2$) is formed in such a manner that a signal of "$55_H$" (hexadecimal) is disposed between two irregular patterns (08*). The signals "$AA_H$" and "$55_H$" are made to be farthest from each other, that is, made to be of opposite phase.

Next to the address mark portion, a group of data are disposed. The group of data are constituted by a block sync (BS) as a synchronizing signal disposed every block, data (Data) as the main information to be transmitted, control data (CD) as address information or the like, an error detection code (CRC) and an error correction code (ECC) for those data. The postamble (PO) is disposed next to the data group, and a gap is formed next to the postamble.

In the first format, the capacity of data as main information is established to be 1024 bytes. Those data of 1024 bytes, the control data (CD), the error detection code (CRC), and the error correction code (PARITY) are arranged, for example, as shown in FIG. 5. The error correcion code is attached in the direction indicated by broken line arrows in FIG. 5. When recording is carried out, the error correcting code is applied in the direction indicated by solid line arrows shown in FIG. 5. The block sync (BS) is added with a period of 20 bytes.

Figure 6:
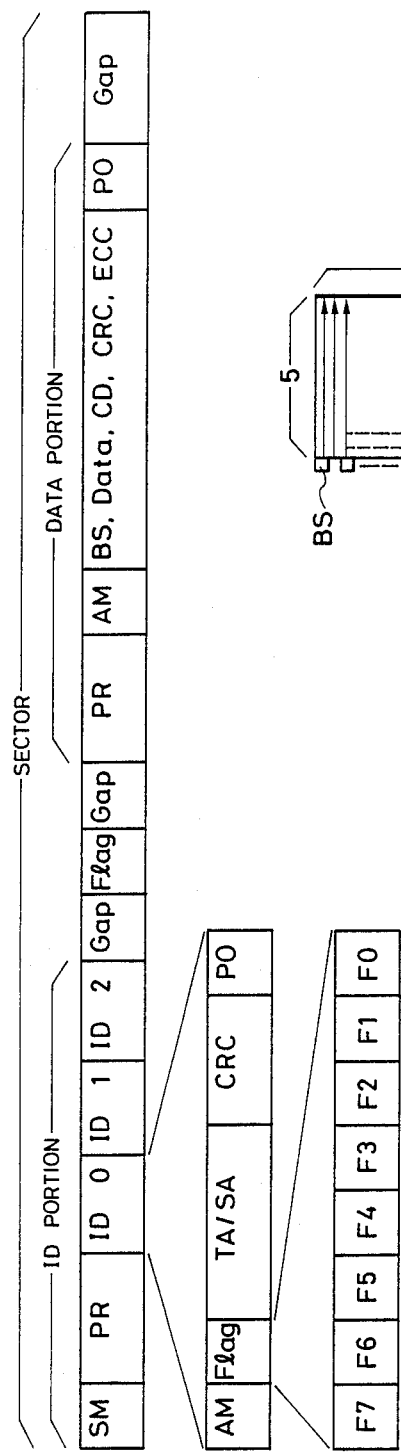
Figure 7:
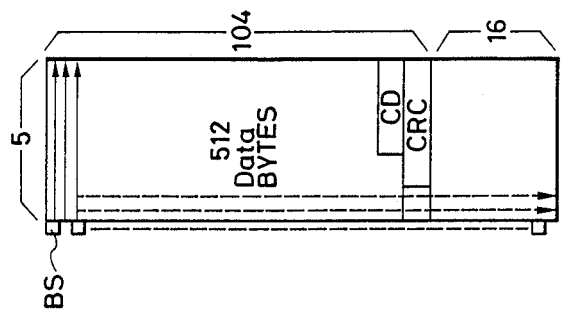

In the second format, the capacity of data as main information is established to be one-half of that of the first format, that is, 512 bytes. As shown in FIGS. 6 and 7, the structure of the second format is basically the same as that of the first format. However, the length of the gap disposed in the trailing position of the sector is shorter than that in the first format.

A group of data are disposed in such a manner as shown in FIG. 7. As apparent from FIG. 7, the arrangement of the data group is different from that of the first format only in that the transversal length of the data group is made to be ½ of that in the case of the first format as shown in FIG. 5. Accordingly, in the second format, the block sync (BS) is disposed with a period of 10 bytes. However, the sequence of the data group is not changed from that of the first format.

Figure 2:
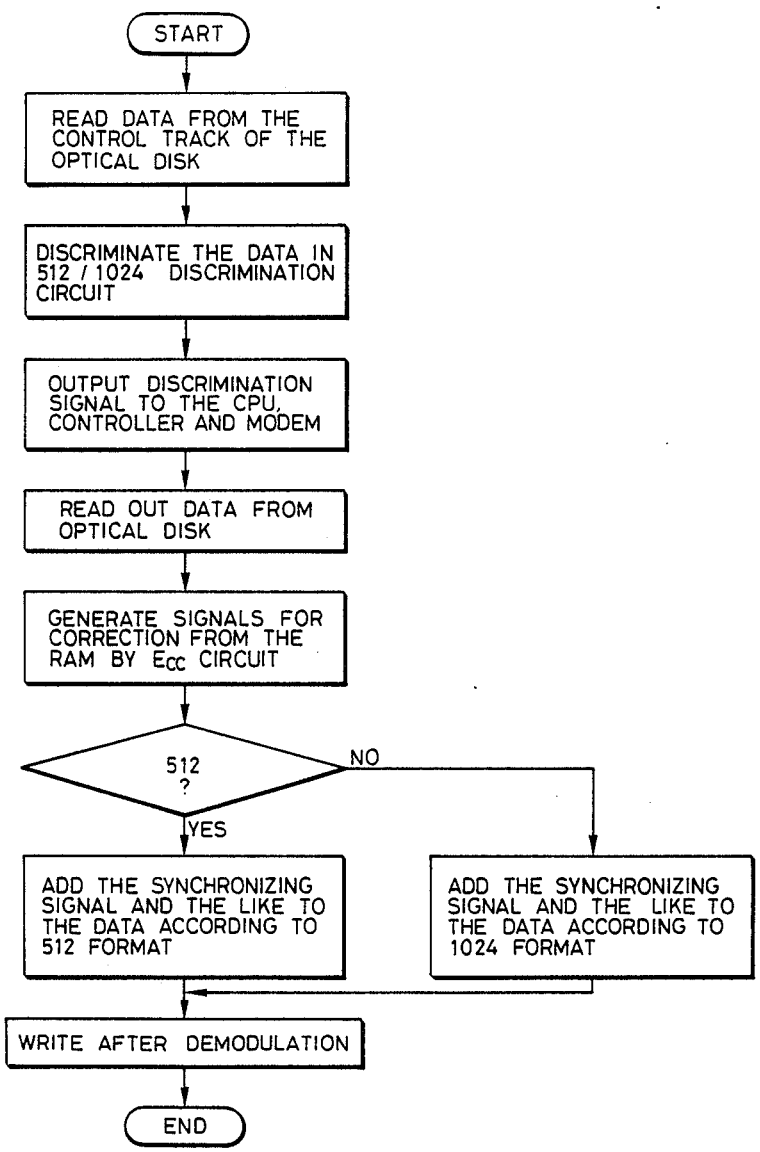
FIGS. 2 and 3 are flowcharts for explaining the operation of the optical disk device.

The flow chart for recording is shown in FIG. 2. When a record command is entered into the CPU 5 or into the host computer 6 of FIG. 1, information is reproduced from a control track (the ID area in every sector in this embodiment) of the optical disk 1 and demodulated by the modem circuit 2. It should be noted that when a format is imparted to an optical disk, predetermined control data have previously been recorded on the control track of the ID area. From the thus demodulated signal, the flag ($F_2$) is read as a discrimination signal of the ID area by the discrimination circuit 11. The flag ($F_2$) is set to "0" when the disk 1 is of the first format (capacity of 1024 bytes) or is set to "1" when the disk 1 of the second format (capacity of 512 bytes). The result of discrimination is applied to the modem circuit 2, the CPU 5, and the controller 10.

The data to be recorded which has been outputted by the host computer 6 through the interface 7 is stored in the RAM 4. The error detection and correction circuit 3 adds an error detection code CRC and an error correction code PARITY to the data stored in the RAM 4. At that time, the controller 10 controls the RAM 4 and the error detection and correction circuit 4 so that the group of data are arranged in such a manner as shown in FIG. 5 or 7 corresponding to the discrimination signal. The group of data read out from the RAM 4 in the direction indicated by the solid line arrows are applied to the modem circuit 2 so as to be modulated by a predetermined system (for example $M^2$). The modulated signal is stored in a sector of a predetermined address in the optical disk 1. At that time, the modem circuit 2 adds the block sync (BS) with a period of 20 bytes or 10bytes corresponding to the discrimination signal.

Figure 3:
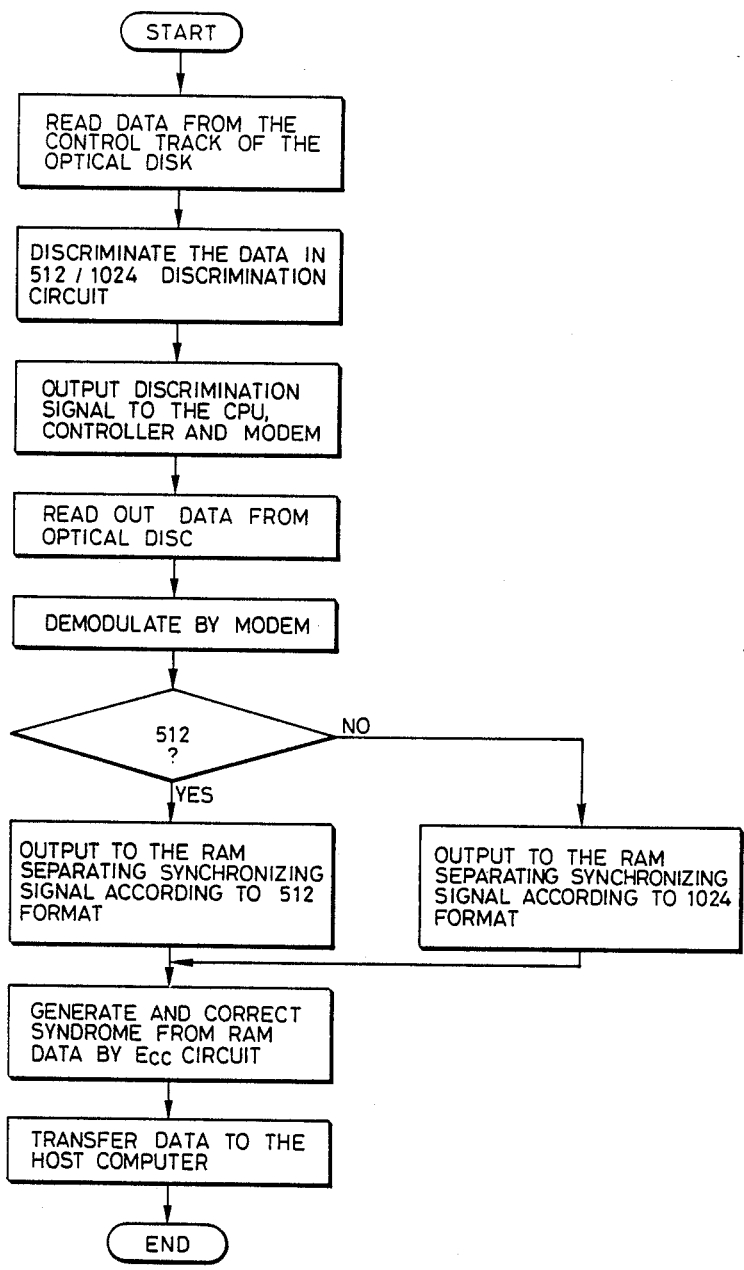

When a read command is entered next, the command is processed, for example, as shown in the flow chart of FIG. 3. The operations of reading data from the control track of the optical disk, detecting a discrimination signal by the discrimination circuit 11, and applying the result of detection to the modem circuit 2, the CPU 5, and the controller 10, are the same as those in the recording operation. Specifically, the flag $F_2$ read from the disk 1 determines if the disk has been formatted according to 512 or 1024 byte data groups. Then, data are read out from the track with a predetermined address of the optical disk 1 and demodulated by the modem circuit 2. At that time, the modem circuit 2 detects the block sync corresponding to the discrimination signal and separates the block sync from the data which is then stored in the RAM 4. Controlled by the controller 10, the error detection and correction circuit 3 generates a data syndrome in the format corresponding to the discrimination signal so as to correct any errors. The data in which errors have been corrected are read out from the RAM 4 and transferred to the host computer 6 through the interface 7.

As described above, the optical disk recording/reproducing system according to the present invention is constituted such that a group of data reconstituted by at least digital data, and error detection and error correction codes added to the digital data. The digital data, the error detection code and the error correction code are disposed in a predetermined sequence in the data group. Synchronizing signals are added to the data at first and second intervals to form a first and a second format respectively. Accordingly, it is possible to record/reproduce the data in the formats having at least two different capacities without adding any wide variations to the circuit arrangement. In addition, the optical disk recording/reproducing system according to the invention is applicable to disks such that areas differing in format are provided on a signal disk.

What is claimed is:

1. A disk recording/reproducing system, comprising:
  means for recording/reproducing to/from a rotating disk a group of data, said group of data comprising digital recording data, error detection and correction codes for said digital recording data and synchronizing signals, said group of data being arranged selectively in a first format and a second format, said synchronizing signals being present in said first format at first intervals and being present in said second format at second intervals different from said first intervals; and
  control means for controlling said recording/reproducing means to convert between said group of data and said digital data selectively according to either said first or said second format.

2. A disk recording/reproducing system as recited in claim 1, wherein said recording/reproducing means is an optical recording/reproducing means and said disk is an optical disk.

3. A disk reproducing system as recited in claim 2, wherein said recording/reproducing means is a reproducing means reproducing said group of data from said optical disk and said converting means extracts said digital recording data from said group of data.

4. A disk reproducing system as recited in claim 3, wherein said control means causes said reproducing means to read control information from said disk to determine whether said group of data is in said first format or said second format.

5. A disk recording/reproducing system as recited in claim 1, wherein said digital recording data in one of said groups of data in said first format consists of a first number of said digital recording data and said digital recording data in one of said groups of data in said second format consists of a second number of said digital recording data different from said first number.

6. A disk recording/reproducing method, comprising the steps of:

recording/reproducing to/from a disk a group of data, said group of data comprising digital recording data, error detection and correction codes for said digital recording data, said group of data being arranged selectively in a first format and a second format; and inserting/extracting synchronizing signals to/from said group of data at first intervals in said first format and at second intervals different from said first inervals in said second format.

* * * * *